Feb. 8, 1944.  R. E. CLAPP  2,341,018
MARINE POPPET VALVE
Filed March 16, 1942
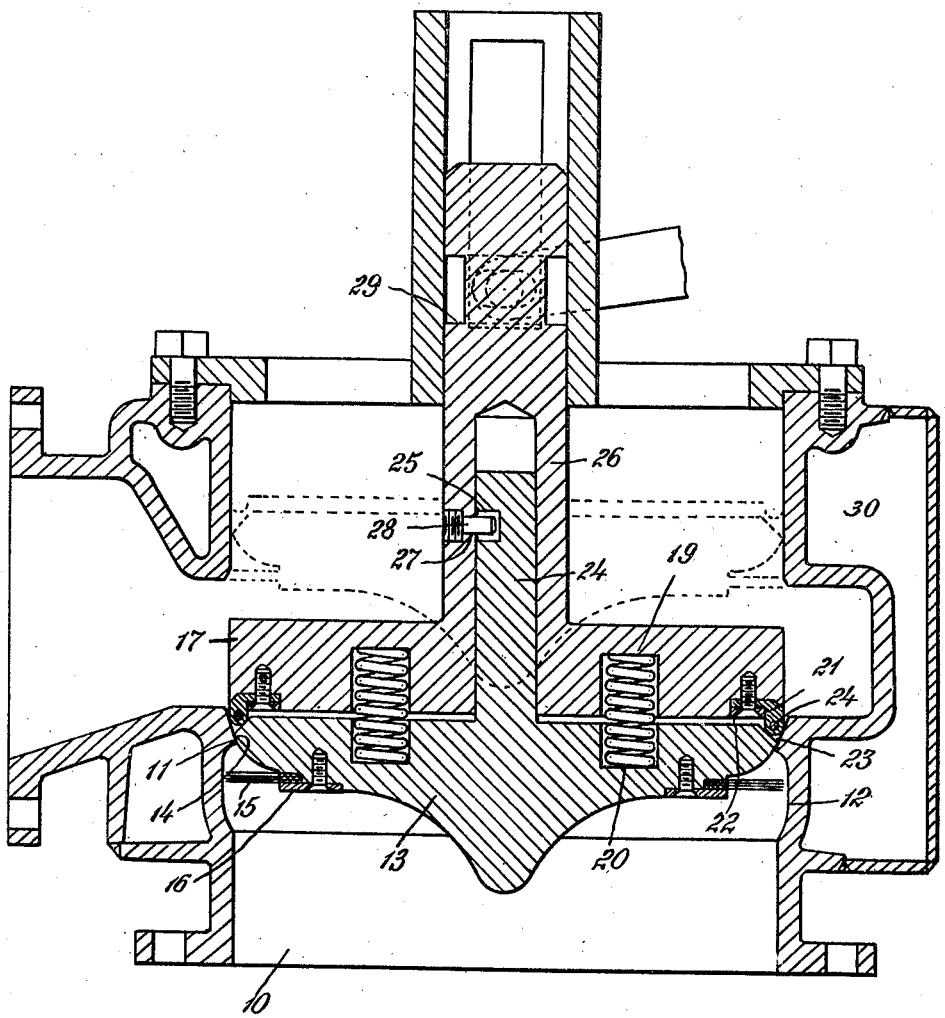
INVENTOR
Revere E. Clapp
BY
Carl E. Ring
ATTORNEY Patented Feb. 8, 1944

2,341,018

UNITED STATES PATENT OFFICE 2,341,018

MARINE POPPET VALVE

Revere E. Clapp, Groton, Conn.

Application March 16, 1942, Serial No. 434,873

9 Claims. (Cl. 251—29)

This invention relates to valves and is more particularly concerned with poppet valves for use on submarines.

In large marine poppet valves, especially those employed in submarines as outside hull engine exhaust valves, it is difficult to obtain satisfactory seating arrangements and at the same time have valves which are simple to construct, install and service. In the exhaust valves on submarines, carbon collects upon the valve seat. At first the deposit of carbon on the seat is of soft snow-like consistency and is easy to remove, but when pressed into a hard brittle state by successive closings of the valve, it forms a hard ring on the valve seat. Portions of this brittle ring of carbon tend to break off from the impact of the valve upon the seat, and these local removals form spaces preventing close seating and causing valve leakage. In addition, the hard carbon on the valve seat and valve will tend to pit the valve and the seat. Also in the operation of ships employing poppet exhaust valves, especially submarines, the weaving of the hull has a very serious effect upon the alignment of operating gear, and thus a serious effect upon a metal to metal seated valve. It is therefore essential to have an exhaust valve in which alignment is of secondary importance, and which will obviate the necessity of frequent regrinding of valve disks and seats, and which at the same time will operate with maximum efficiency.

With service conditions of hot exhaust gases, which may reach the temperature of 600° Fahrenheit, the heavy carbon deposits, and weather exposure ranging from frigid to torrid temperatures, the valves are also subject to distortion, and thus have further causes of leakage. The grinding operation to re-align these valves, or to overcome distortions in one or more parts, is a difficult and expensive operation.

It is an object of this invention to provide a marine poppet valve for exhaust gases, which has the desirable features of a metal to metal seated valve and also those of a soft or flexible seated valve, thus valve grinding is eliminated and alignment of parts is of secondary importance to tightness of seat. It is a further object to provide a poppet valve with soft or flexible seat which has a bonnet arrangement for isolating the sealing ring from the hot exhaust gases. It is a further object to provide a poppet valve which cleans its seat of carbon deposit each time the valve is closed. It is a further object of this invention to provide an exhaust valve which is compact, simple and rugged in construction and which is economical to build, install and service.

For a better understanding of this invention, reference is made to the drawing in which:

The figure is a side elevational view in section of the poppet valve of this invention.

In the form shown in the figure, 10 represents the inlet nozzle of a poppet exhaust valve, at the upper end of which there is a valve seat 11. This valve seat is in the form shown is at an angle of approximately 15 to 20 degrees from the perpendicular, since it is found that this angle gives satisfactory results. Below the valve seat, the walls of the inlet nozzle are curved outwardly as shown at 12. Resting upon the valve seat is a false valve disk 13, which is preferably of non-corrosive, heat-resisting metal. The false valve disk is so shaped at its outer periphery 14 to provide a metal to metal contact with the valve seat. Below the periphery 14, an annular wire brush 15, also of non-corrosive and heat-resisting material, is attached to the false valve disk by the annular ring 16, bolted to the false valve disk. The brush 15, is of such a length that it will fit within the curved portion of the nozzle, at the same time will sweep the valve seat when the false disk is raised or lowered.

Above the false disk, is the valve disk proper 17 and interspaced between them are four preloaded coiled springs fitted in the depressions 20 of the false disk and the opening 19 of the valve disk. The springs are sufficiently strong to keep the false disk and the valve disk separated, while the annular brush is being pushed through the valve seat during the valve closing operation. An annular sealing ring 21, preferably of soft or flexible material is attached to the lower circumference of the valve disk and held securely in place by the annular ring 22, bolted to the valve head. The sealing ring 21, may be of any soft or flexible material which will withstand heat, temperature changes, water, etc., such as asbestos, or may be in the form of a pressure sealed hollow metal ring held in place in a similar manner as the ring as shown. The sealing ring is squeezed into the groove 23 formed by the false disk and the valve seat. All of the force of the valve disk stem, when the poppet valve is seated, is applied to this sealing ring. In the form shown in the drawing the sealing ring is of soft material, and its form is maintained by a circumferential wire 24 imbedded in the material. By means of this sealing ring a combination metal to metal closure and a flexible sealing ring closure is provided.

As an integral part and extending upwardly from the false valve disk there is a false valve disk stem 24. This false valve disk stem is provided with an annular slot 25. Extending upwardly from the valve disk is a valve stem 26, which surrounds the false disk stem 24 and is provided with a hole 27 in registry with the slot 25. A pin 28 threaded into the hole 27, also extends into the slot 25. However, to provide a means for independent movement of the valve head and the false disk, the width of slot 25 is made approximately ¼ of an inch wider than the diameter of pin 28 to allow a play of approximately ¼ of an inch between the false disk and the valve disk. Near the top of the valve stem an annular slot 29 is provided so that thrust washers or other means for raising and lowering the valve may be employed.

In the operation of this poppet valve, when the valve is in closed position, the false disk resting upon the valve seat provides a metal to metal closure, and in addition, the sealing ring fitting in the groove formed by the false disk and the valve seat, and pressed in place by the valve disk, provides an extra and efficient closure. When the valve stem is lifted, it moves approximately ⅛ of an inch before the pin 28 of the valve stem contacts the upper surface of the slot in the false disk stem, thus an insulating air space is provided between the false disk and the sealing ring when the valve is in the valve open position. In the action of raising the false disk, the annular brush is drawn across the valve seat effectively sweeping the valve seat to remove the carbon deposited thereon. When the valve disk and false disk are raised to valve open position, the sealing ring is reshaped by and is in contact with the water cooled jacket 30. In this position the annular brush will contact with the lower portion of said water jacket and thus form an effective screen to keep the hot exhaust gases from contact with the sealing ring. In the open position, the action of the coil springs between the valve head and the false disk will effectively prevent vibration or movement of the false disk.

When the poppet valve is closed the thrust washers will lower the mechanism by its action on the valve stem. The annular brush will again contact the valve seat, sweeping it free of carbon coating. Upon the contact of the annular brush upon the valve seat, the force applied to the valve stem will be communicated to the coil springs, thus forcing the annular brush across the valve seat and seat the false disk upon the valve seat. The sealing ring held by the valve disk will then seat in the groove and be forced into tight position therein by the force of the valve disk stem. It should here be noted that the present construction provides an added advantage since all force is applied to the sealing ring when the valve disk is lowered to close the poppet valve.

By this construction a poppet valve is provided which is tight without grinding, unaffected by normal misalignment of parts, is long-wearing and easily and quickly serviced by replacing the sealing ring. In addition, the sealing ring is held out of the path of and protected from the hot exhaust gases which are so destructive of this type of equipment.

The description of this device is for illustration only, and the valve of this invention is not limited to the exact form as shown, and changes in the specific form may be made within the scope of what is claimed without departing from the spirit of this invention.

I claim:

1. A marine poppet valve comprising an exhaust outlet, a valve seat, a false disk adapted to contact the valve seat, a valve disk having a sealing ring mounted thereon and adapted to be pressed into closed position by said valve disk, the false disk and the valve disk separated by a plurality of coil springs, and means for raising and lowering the valve disk and false disk.

2. A marine poppet valve for submarines comprising a valve seat having an angle bevel, a false disk having a bevel at its upper periphery to form an annular groove when resting upon the valve seat, a valve disk having a flexible sealing ring mounted on the lower side thereof in a position adapted to fit into the groove formed by the valve seat and the false disk, and pressed in place by said valve disk and means for raising and lowering the valve disk and false disk.

3. A marine poppet valve comprising a valve seat having an angle bevel, a false disk adapted to rest on the valve seat and having an angle bevel at its upper periphery to form an annular groove when resting upon the valve seat, a valve disk mounted above said false disk on a plurality of springs supported by said false disk to maintain a space between the false disk and the valve disk, a flexible sealing ring fixed on the lower periphery of the valve disk, and adapted to fit into the annular groove formed by the valve seat and the false disk, and means for raising and lowering the composite valve disk and false disk.

4. A marine poppet valve comprising a valve seat, a false disk adapted to rest upon the valve seat, a valve disk mounted above said false disk and connected thereto, an annular brush fixed on the lower side of the false disk in such a position to brush axially across the valve seat when the false disk and the valve disk are raised or lowered.

5. A marine poppet valve comprising an inlet having a valve seat at its upper end, a false disk the outside edge of which is adapted to rest upon the valve seat, an outwardly extending annular brush fixed to the false disk below its outside edge, said brush being in position to sweep axially across the valve seat when the false disk is raised or lowered.

6. A marine poppet valve consisting of an inlet having a valve seat at its upper end, a valve bonnet stowage recess with a cooled wall and a downwardly extended lip, a false disk the periphery of which is adapted to rest upon the valve seat, a valve disk mounted above said false disk and yieldably connected thereto, the false disk having an outwardly extending annular brush fixed thereto below its periphery and contacting the said bonnet extended lip to form an isolating shield for the valve and the false disk when the false disk and valve disk are in raised position.

7. A marine poppet valve comprising an exhaust outlet, a valve seat, a false disk adapted to contact the valve seat, a valve disk having a sealing ring mounted thereon adapted to rest upon the valve seat, the valve disk being yieldably mounted above said false disk so as to transmit the load of the valve disk to the valve seat through the sealing ring and the false disk.

8. A marine poppet valve for submarines, comprising a valve seat, a composite valve disk having a soft sealing ring and an upwardly extending stem, a valve bonnet stowage recess with a cooled wall and a downwardly extending lip, said composite valve disk having an annular wire brush extending radially outward on the lower side thereof, said brush contacting the said bonnet lip to form an isolating shield for the soft sealing ring and valve disk, when the valve disk is raised to open position.

9. A marine poppet valve for submarines, comprising a valve seat, a false disk contacting the valve seat and forming an annular groove at the point of contact, a valve disk mounted above the false disk and having a soft sealing ring fixed on the lower side thereof in a position to be pressed into said groove when the false disk is lowered into closed position, a bonnet recess having a cooled wall above the valve seat to receive the valve disk and means on the false disk to isolate the soft sealing ring and valve disk, when the valve is raised to open position.

REVERE E. CLAPP.